March 2, 1926. 1,575,185

T. STENHOUSE

AUTOMATIC TRANSFER DEVICE

Filed Sept. 17, 1923 2 Sheets-Sheet 2

Inventor
Thomas Stenhouse

Eccleston & Eccleston
Attorneys

Patented Mar. 2, 1926.

1,575,185

UNITED STATES PATENT OFFICE.

THOMAS STENHOUSE, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA.

AUTOMATIC TRANSFER DEVICE.

Application filed September 17, 1923. Serial No. 663,222.

*To all whom it may concern:*

Be it known that I, THOMAS STENHOUSE, a citizen of the United States, and a resident of Washington, in the county of Washington and State of Pennsylvania, have invented certain new and useful Improvements in Automatic Transfer Devices, of which the following is a full, clear, and exact description.

In general, the present invention relates to a mechanism for transferring bottles, jars, jugs and similar articles from one position to another, but it is particularly adapted for transferring such articles from a glass-forming machine to a conveyor, by which they may be carried to a lehr or to some other desired point; and the invention will be described herein in connection with this particular use.

In the well known operation of a glass machine a table carrying a number of molds is caused to rotate step by step, the glass being subjected to successive operations until the article is completely formed, and the mold reaches the discharging station. At this station the mold may be automatically opened, and, in accordance with the structure illustrated in my application Serial No. 676,570, the article is automatically retracted from the mold. In other types of glass machines the mold may be opened, but without retracting the article therefrom. In either case it is highly desirable that some device, simple in construction and yet accurate and efficient in operation, be employed to lift the article from the rotatable table of the glass machine and place it firmly on a conveyor by which it may be carried to a lehr or to any other desired point. And the object of the present invention is to provide an extremely simple apparatus of this character which will lift and carry the glass articles without danger of breaking or otherwise damaging them, and which will place the articles on the conveyor in a steady or stable manner, so that there will be no tendency to topple over.

I am aware that complex structures have been previously devised for lifting, carrying and depositing glass articles; but the apparatus disclosed herein is believed to be far more simple in construction than any previously known.

The invention will be clearly understood from the following detailed description, when taken in connection with the accompanying drawings, in which.

Figure 1:
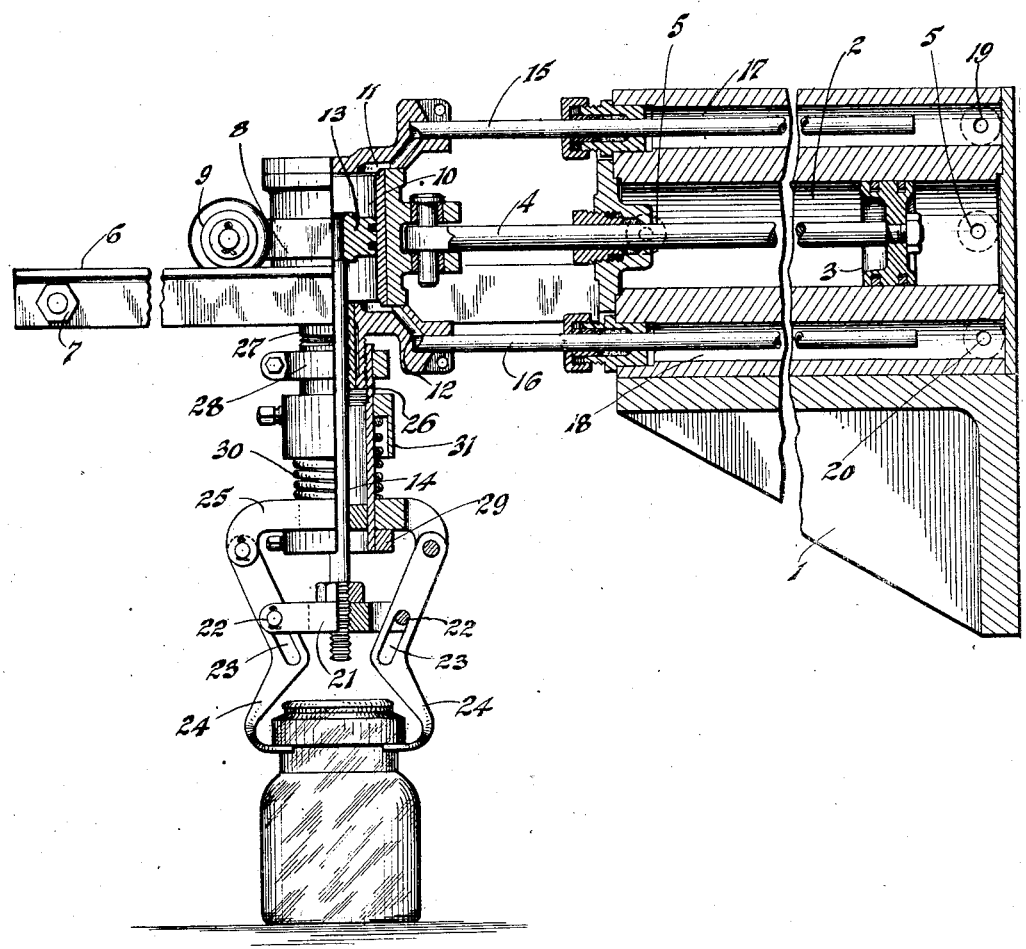
Figure 1 is a side elevation of the complete apparatus, various parts being in section to more clearly show the construction. Also for the purpose of more clearly showing one construction, the grippers and crossbar have been turned through 90° from their true operating position; their true position being as shown in Figure 2.
Figure 2:
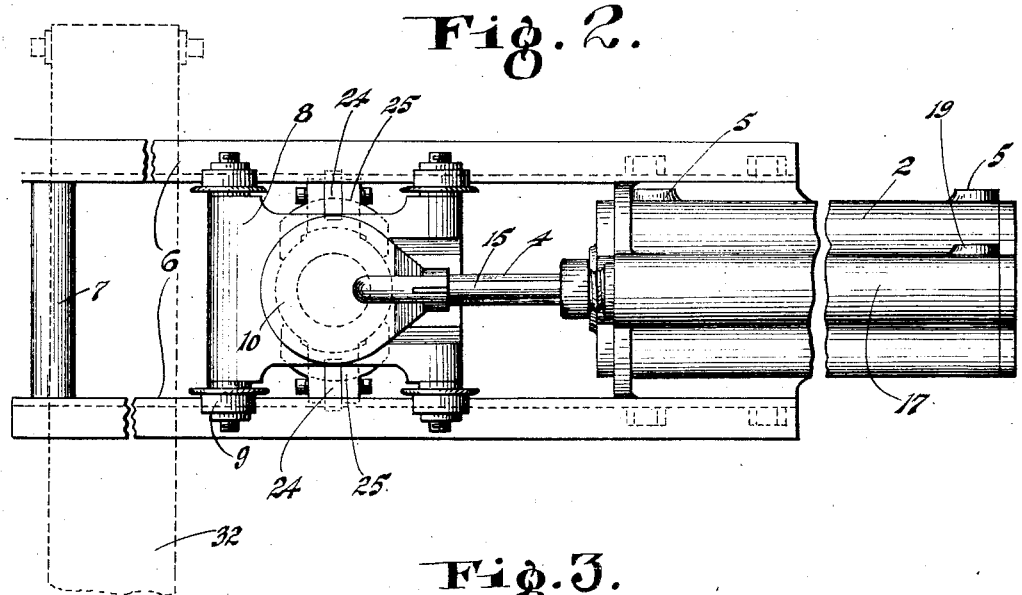
Figure 2 is a plan view of the apparatus, the track being broken away.

Referring to the drawings more in detail, numeral 1 indicates a bracket which is rigidly attached to any suitable stationary part of a glass-forming machine; as, for example, to a jug machine such as illustrated in my application Serial No. 676,570, filed November 23, 1923. A cylinder 2 is mounted on this bracket, and is provided with a piston 3 and piston rod 4, which are caused to reciprocate in the usual manner by air or other fluid pressure admitted to opposite ends of the cylinder through appropriate ports 5, 5. Tracks 6, 6 extend outwardly from the cylinder, and in the specific embodiment of the invention illustrated herein these tracks are mounted directly on the cylinder; the tracks being maintained in parallel relation by a spacer 7. A carriage 8, mounted on rollers 9, is adapted to reciprocate on this track; the carriage being reciprocated by means of the piston rod 4, which is directly connected to a cylinder 10 mounted on the carriage.

The cylinder 10 is provided with ports 11 and 12 for controlling the reciprocation of the piston 13 and piston rod 14; and associated with the ports 11 and 12 are pipes 15 and 16, respectively, which are telescopically mounted in the cored chambers 17 and 18, to which air or other fluid pressure is alternately admitted through the ports 19 and 20, respectively.

Mounted on the lower end of the piston rod 14 is a crossbar 21 having a pin and slot connection, indicated by numerals 22 and 23, with grippers 24, 24 pivotally attached at their upper ends to a head member 25 slidably mounted on a sleeve 26 which is threaded to the lower cylinder head 27 of cylinder 10. The threaded portion of the sleeve 26 is preferably split, and I have provided the clamp 28 for rigidly holding the sleeve in adjusted position. A collar 29, preferably adjustable, is mounted on the lower portion of the sleeve beneath the head member 25; the latter being held against the collar by the pressure of the coil spring 30 also mounted on the sleeve and having its compression controlled by an adjustable cap 31.

Numeral 32 refers to a conveyor of any preferred type, on which the articles are deposited and carried thereby to the lehr or other desired point.

The operation of the apparatus will now be described; it being assumed that the carriage has been retracted, and that the piston 13 is at the end of its down stroke.

Air or other fluid pressure will be admitted to the chamber 18 through the port 20, and then passes through pipe 16 and port 12 to the lower portion of the cylinder 10. The piston 13 and rod 14 are thus lifted, and due to the pin and slot connection between the crossbar 21 and grippers 24, the latter are drawn inwardly to grip the article; the position of the parts being as shown in Figure 1. The pins 22 are now at the upper limit of their travel in the slots 23, and further inward movement of the grippers is prevented; but the piston 13 has only partly finished its upward stroke, as shown in Figure 1, and as the piston and rod continue their upward movement the crossbar will lift the grippers and head member 25 bodily against the pressure of the spring 30.

Pressure will now be automatically admitted to the cylinder 2, causing the entire mechanism to travel outwardly on the tracks 6. A the end of this outward stroke of the piston 3 the carriage and entire gripping mechanism will be directly over the conveyor 32, upon which the article is to be deposited.

Figure 3:
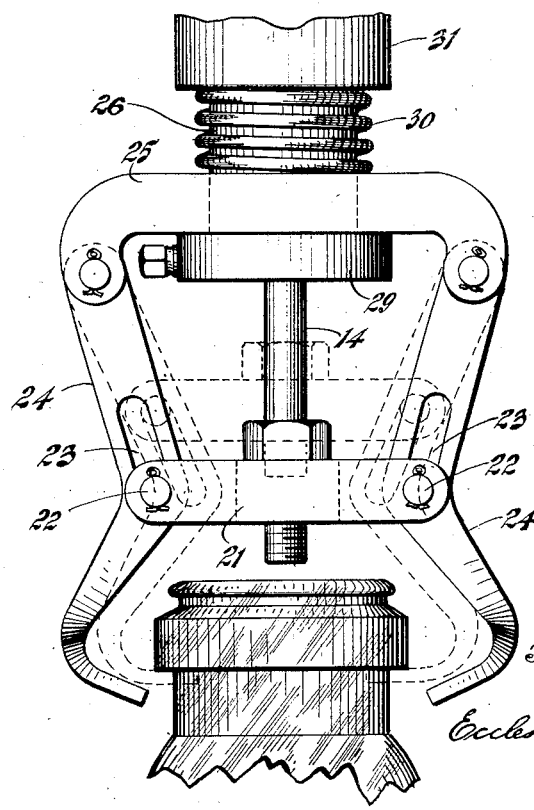
Figure 3 is a detail view, showing the grippers in open position; and also showing in dotted lines the position assumed by the grippers and associated parts when in closed position.

Air is now admitted to the chamber 17 through the port 19, and passes through the pipe 15 and port 11 to the upper end of cylinder 10. The piston 13 and rod 14 move downwardly and the spring 30 forces the head member down, so that the grippers are retained in their closed position. This bodily movement continues until the head member contacts with the collar 29, at which point the article is deposited on the conveyor; the position of the parts at this time being illustrated in dotted lines in Figure 3. The piston rod continues its downward movement, and through the engagement of the pins 22 in the slots 23 the grippers are moved to open position, as indicated in full lines in Figure 3, so that the article is free to be carried along by the conveyor to its destination.

The operation is now repeated, the gripping mechanism being lifted, the carriage retracted, and the mechanism lowered to grip the next article, thereby completing the cycle of operations.

For ware of different height it will be necessary to vary the lowermost position of the grippers, and obviously this may be accomplished by adjusting the position of the sleeve 26 on the cylinder head 27.

It will be apparent from the foregoing description that I have devised an automatic transfer device which consists of relatively few parts of simple construction, and yet which will function in an efficient manner to lift the articles, transport and deposit them at the desired point without any liability of damage thereto.

It will be understood, of course, that the invention is not restricted to the details of construcion and arrangemen of parts specifically illustrated and described herein, as numerous changes and modifications may be made therein without departing from the invention, and all such I aim to include in the scope of the appended claims.

What I claim as new and desire to secure by Letters Patent is:

1. A transfer device for glass ware including a fluid pressure cylinder, a vertically reciprocable piston rod operated thereby, a crossbar carried by the piston rod, a pair of pivotally mounted grippers operatively connected with the crossbar and having downwardly and inwardly inclined slots therein, means carried by the crossbar engaging said slots to open and close the grippers and to lift them bodily, and means for reciprocating the cylinder and piston bodily in a substantially horizontal plane.

2. A transfer device for glassware including a fluid pressure cylinder, a vertically reciprocable piston rod operated thereby, a crossbar carried by the piston rod, a slidably mounted head member, grippers pivotally mounted upon the head member and having downwardly and inwardly inclined slots, means carried by the crossbar engaging said slots to open and close the grippers and to lift them bodily, and means for reciprocating the cylinder in a horizontal path.

3. A transfer device for glassware including a track, a carriage mounted thereon, a fluid pressure cylinder mounted on the carriage, a vertically reciprocable piston rod operated by the cylinder, a crossbar carried by the piston rod, a head member having a limited vertical movement, a spring for forcing the head member to its lowermost position, grippers pivotally attached to the head member and having downwardly and inwardly inclined slots, means carried by the crossbar for traversing said slots, and means for imparting a reciprocating movement to said carriage.

4. A transfer device for glassware including a track, a carriage mounted thereon, a fluid pressure cylinder mounted on the carriage, a vertically reciprocable piston rod operated by the cylinder, a crossbar carried by the piston rod, a head member mounted for limited sliding movement, grippers pivotally attached to the head member and having downwardly and inwardly inclined slots, pins carried by the crossbar and traversing said slots to operate the grippers, said pins also adapted to lift the head member and grippers bodily when they reach the upper ends of the slots, and means for reciprocating the carriage.

5. A transfer device including a cylinder and a vertically reciprocable piston rod, a crossbar carried by said piston rod, a pair of pivotally mounted grippers operatively connected with the crossbar and having downwardly and inwardly inclined slots therein, and means carried by the crossbar engaging said slots to open and close the grippers and to lift them bodily relative to the cylinder.

6. A transfer device including a cylinder and a vertically reciprocable piston rod, a crossbar carried thereby, a slidably mounted head member, grippers pivotally mounted on the head member, and having downwardly and inwardly inclined slots, and means carried by the crossbar engaging said slots to open and close the grippers and to lift them bodily relative to the cylinder.

7. A transfer device including a cylinder and a vertically reciprocable piston rod, a crossbar carried thereby, a head member having a limited vertical movement relative to the cylinder, a spring for forcing the head member to its lowermost position, grippers pivotally attached to the head member and having downwardly and inwardly inclined slots, and means carried by the crossbar for traversing said slots.

8. A transfer device including a cylinder and a vertically reciprocable piston rod, a crossbar carried thereby, a head member mounted for limited sliding movement, grippers pivotally attached to the head member and having downwardly and inwardly inclined slots, pins carried by the crossbar and traversing said slots to operate the grippers, said pins also adapted to lift the head member and grippers bodily when they reach the upper ends of the slots.

9. A transfer device including a vertically reciprocable piston rod, a stationary sleeve surrounding the rod, a head member slidably mounted on the sleeve, grippers pivotally attached to the head member, and a crossbar carried by the piston rod operatively connected with the grippers for opening and closing them and for lifting the grippers and head member bodily.

10. A transfer device including a slidably mounted head member, a pair of grippers pivotally attached thereto, an abutment for limiting the downward movement of the head member, a vertically reciprocable piston rod, and means carried by the piston rod for opening the grippers, said means being operative to open the grippers only after the head member contacts with the abutment.

11. A transfer device including a slidably mounted head member, a pair of grippers pivotally attached thereto, an abutment for limiting the downward movement of the head member, a spring for forcing the head member against said abutment, a vertically reciprocable piston rod, and means carried by the piston rod for opening the grippers after the head member contacts with the abutment.

12. A transfer device including a slidably mounted head member, a pair of grippers pivotally attached to the head member, a vertically reciprocable piston rod, and means carried by the piston rod for closing the grippers and for lifting the head member and grippers bodily, said lifting means being operative only after the grippers have been closed.

THOMAS STENHOUSE.